Dec. 24, 1946.   J. A. STEWART   2,413,198
LENS INSPECTING AND LAYOUT DEVICE
Filed July 17, 1944
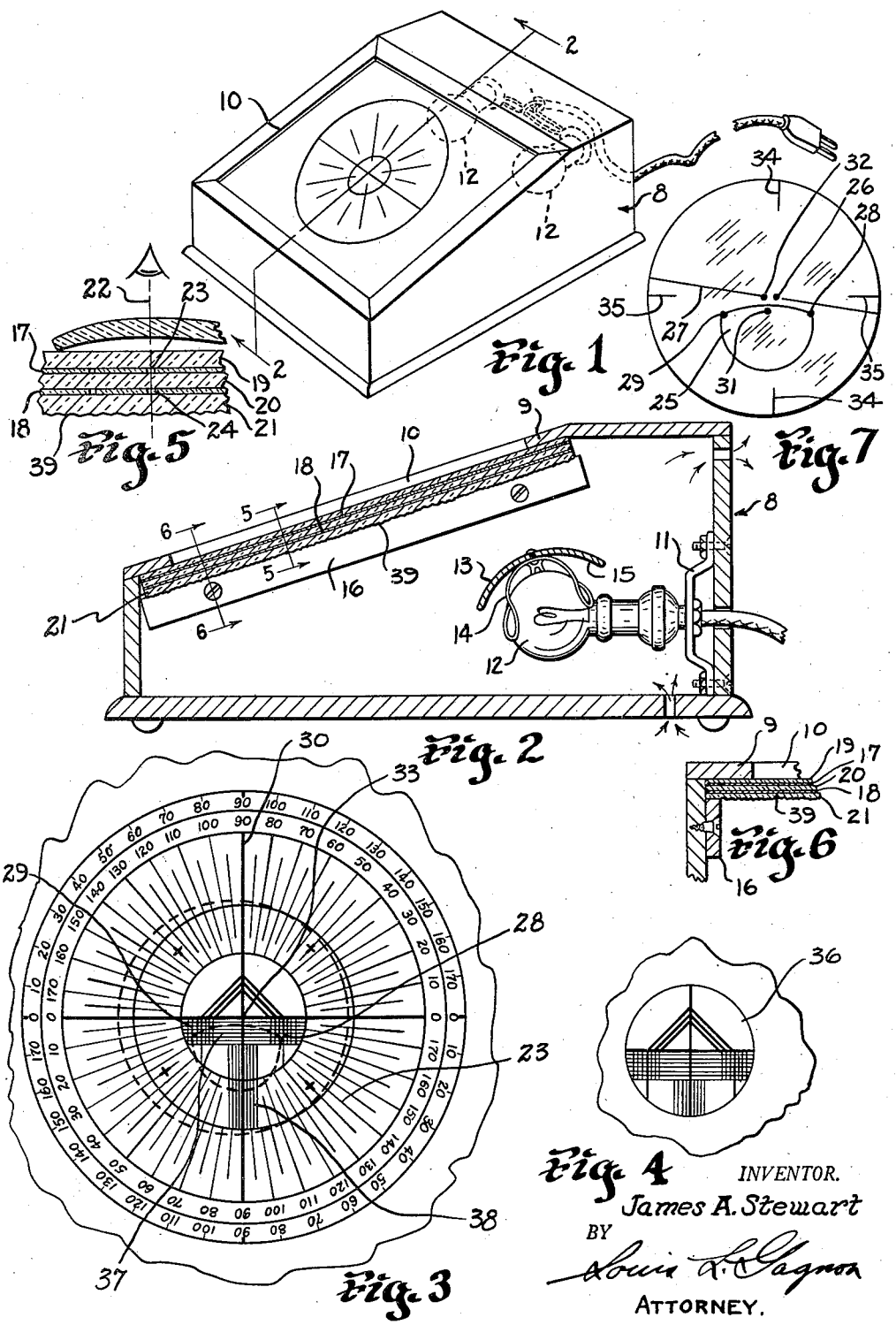
INVENTOR.
James A. Stewart
BY
Louis L. Gagnon
ATTORNEY.

Patented Dec. 24, 1946

2,413,198

UNITED STATES PATENT OFFICE 2,413,198

LENS INSPECTING AND LAYOUT DEVICE

James A. Stewart, Cornwallis, Nova Scotia, Canada, assignor to American Optical Company, Southbridge, Mass., a voluntary association of Massachusetts Application July 17, 1944, Serial No. 545,303

5 Claims. (Cl. 33—174)

This invention relates to improvements in means for inspecting and laying out the perscriptive characteristics of lenses and lens blanks.

One of the principal objects of this invention is to provide a protractor for use in laying out lens blanks and lenses which will insure the observer that his inspection or line of sight is exactly perpendicular or normal to the protractor and to the lens or lens blank being inspected and marked.

Another object is to provide a protractor of the above character for use in laying out lens blanks and properly marking the same preparatory to grinding, finishing, or other further treatment and for inspecting finished lenses and their mounting while obviating a condition known in the art as an error due to "parallax."

Another object is to provide a protractor of the above character with two substantially similar charts spaced apart one above the other and so that the line of vision of the eye of the observer or individual laying out the blank or lens will be perpendicular with any corresponding line or mark on the two charts through the blank or lens being layed out or inspected.

Another object is to provide a method of forming two spaced charts which will insure that they are of identical patterns and size.

Another object is to provide a protractor of the above character with two chart members spaced apart one above the other with the lower chart having markings thereon only similar to a portion of the upper chart whereby the similar patterns of the upper and lower charts may be matched during the laying out of the blank or inspection of the lens for avoiding or obviating "parallax" through the areas of said portions of similar pattern while simultaneously providing only one chart portion throughout the remainder of the area of the upper chart.

Another object is to provide an arrangement of the above character with illuminating means of substantially uniform intensity throughout the areas of the charts.

Other objects and advantages of the invention will become apparent from the following description taken in conjunction with the accompanying drawing and it will be apparent that many changes may be made in the details of construction, arrangement of parts and methods shown and described without departing from the spirit of the invention as expressed in the accompanying claims. I, therefore, do not wish to be limited to the exact details of construction, arrangement of parts and methods shown and described as the preferred forms only have been given by way of illustration.

The present invention is of particular value in connection with the inspection or laying out of bifocal or multifocal lenses or lens blanks for centering and decentering the same and locating the meridians of the lenses or blanks for aiding in the accurate obtaining of the prescriptive characteristics desired of the finished lens, or for edging, shaping or otherwise forming the lenses to the size and shape desired for the resultant ophthalmic mounting while retaining the proper prescriptive characteristics.

Referring to the drawing:

Fig. 1 is a perspective view of the device embodying the invention;

Fig. 2 is an enlarged sectional view taken as on line 2—2 of Fig. 1 and looking in the direction indicated by the arrows;

Fig. 3 is an enlarged fragmentary view of the protractor charts;

Fig. 4 is a fragmentary view of a modified form of chart to be used with a chart such as shown in Fig. 3;

Fig. 5 is an enlarged fragmentary sectional view taken as on line 5—5 of Fig. 2 diagrammatically illustrating the use of the device;

Fig. 6 is a fragmentary sectional view taken as on line 6—6 of Fig. 2; and

Fig. 7 is a diagrammatic view of a blank having the positional indications marked thereon resulting from the use of the device embodying the invention.

Referring more particularly to the drawing wherein like characters of reference designate like parts throughout the several views, the device embodying the invention comprises a casing 8 having an upper angled wall portion 9 having an opening 10 therein. Internally of the casing there is supported, by a suitable bracket 11, spaced sources of illumination 12 in the form of conventional electrical lamps or bulbs. The inner exposed surfaces of the side walls, bottom and top of the casing 8 are preferably painted or coated with a white substance. The lamps or bulbs 12 preferably have caps 13 secured thereto as by spring clamps or the like 14. The inner surface 15 of the caps 13 are preferably white.

Supported in alignment with the opening 10 by suitable cleats or the like 16 is a pair of spaced protractor members 17 and 18 each preferably having chart markings thereon of the pattern illustrated in Fig. 3, that is, each having a similar chart pattern of similar dimensional characteristics.

It is to be understood, however, that any design of chart may be used in accordance with the present invention and that the chart illustrated in Fig. 3 is only by way of illustration.

The protractor members may be in the form of relatively thin films having the chart markings photographically produced thereon either with the chart lines being transparent and the areas surrounding said chart lines opaque or with the lines opaque and the surrounding areas transparent, that is, the said charts or protractor members may be either taken in negative or positive form as known in the photographic art. Instead of forming the protractor members in the form of separate films, they may be reproduced on transparent plates of glass or other suitable material by photographic methods or the said lines may be etched or otherwise produced.

When separate relatively thin films are used, the said films, as illustrated in Figs. 2 and 5, are sandwiched between transparent layers of glass or other suitable material 19, 20, and 21. They may be supported in this position in the opening 10 through the use of cleats 16 or other suitable means. A homogeneous lamina may be formed of the separate charts and sheets of glass through the use of a suitable transparent adhesive or the like commonly used in forming commercial laminations, placed between the films and the contiguous surfaces of the glass plates and through the application of heat and pressure for bringing about an intimate bond.

It is to be understood that the chart markings of the protractor members 17 and 18 must be positioned in absolute alignment with each other in a direction perpendicular or normal to the planes of said charts. This is to insure that the line of sight of the observer, as diagrammatically illustrated at 22, will be perpendicular with any of the corresponding lines or markings of the two charts. Such lines are diagrammatically illustrated by the transparent areas 23 and 24 of Fig. 5. These transparent areas represent any one of the various markings of the protractor member or chart as illustrated in Fig. 3. It is particularly pointed out that the invention is not limited to any particular chart configuration. It is of necessity, however, that the portions to be viewed perpendicularly must be of the same configuration and dimensional characteristics in order to obviate "parallax."

Fig. 4 shows a modified form of one of the charts wherein only the center of the chart is provided with graduations. A chart of this nature may be used in combination with a chart of the type shown in Fig. 3, as the most critical portion of the charts are the center portions 36 over which the segment is adapted to lie when the lens blank is being marked.

Fig. 7 shows a bifocal lens blank which has been laid out and marked to suit certain required prescriptive characteristics and is now ready for grinding, polishing and edging. It will be seen that with the proper markings on the blank that the further operations required to finish the lens may be accomplished with ease, as the lens blank may then be accurately positioned in the different machines in proper relation with the operating tools of said machines.

In this specific case, the resulting lens requires that the segment 25 be decentered two millimeters from the optical center 26 and the horizontal axis 27, for one of the surfaces to be ground on the blank, to be 170°. The decentering of the segment of the lens blank means moving the center of the segment away from the optical center, to the right or left depending with which eye the lens is to be used.

In marking this lens blank, the first step is to place the blank over the charts with the upper corners 28 and 29 of the segment in alignment with each other and mark the said corners. The corners 28 and 29 are then spaced equidistant from the vertical center line 30 of the chart and the center dot 31 is then marked on the surface of the blank along the horizontal line 37 bisecting the two corner dots. The preliminary optical center 32 is then marked on the blank a predetermined distance above the top line of the segment 25 and in vertical alignment with the center dot 31 along the vertical center line 30. To cause decentration of the segment the optical center 32 is placed upon the center 33 of the protractor, and the lens blank is then moved to the right or left as required, the amount called for in the prescription, keeping the dots or marks 28 and 29 in alignment with the line 37 of the protractor as shown in dotted lines in Fig. 3. When the blank is in the desired position, the new optical center 26 is marked on the surface of the blank using the center of the protractor 33 as a guide. While the lens blank is in this position, the horizontal and vertical guide lines 34 and 35 are marked on the blank adjacent the edge thereof. It will be seen that the resultant lens will have its segment decentered the required distance from the optical center of the lens.

To mark the lens blank so that one surface thereof may be ground with the axis at 170°, the blank is placed with the optical center 26 on the center of the protractor and with the segment marks 28 and 29 lined up. Then the blank is marked as indicated at 27 along the 170° line of the protractor. This will allow the blank to be positioned properly in the various grinding, cutting and edging machines for completing the lens.

The horizontal lines 37 of the chart are preferably spaced one millimeter apart and are used as stated above in determining the position of the upper line of the segment 25 with respect to the optical center of the finished lens. The vertical lines 38 are preferably spaced one millimeter apart and are used to determine the decentration of the optical center of the lens to position the segment in or out with respect to the optical center.

It is to be understood that both the outer and inner protractor members 17 and 18 are aligned with each other in a direction perpendicular to the plane of the surfaces thereof thereby causing the line of sight of the observer, when placing the markings on the surfaces of the blank, to assume said direction of the observation thereby eliminating the error of "parallax" which will cause the resultant positional relation of the optical elements of the lens to be in accurate relation with each other in the final lens.

The inner surface 39 of the glass layer 41 is preferably sand blasted so as to cause the light from the sources of illumination 12 to be diffused prior to passing through the protractor charts. This diffused light could be obtained through the use of a separate ground glass screen, if desired, positioned between the protractors and the sources of illumination 12. It is particularly pointed out that the illumination from the sources 12 is not direct but it is rather reflected due to the providing of the inner surfaces of the casing 8 with a coating of white material.

In Fig. 4, there is illustrated a modified form of under-protractor simulating the under-protractor chart 18. In this instance the said chart is provided only with a central area 36 having scale markings thereon simulating the scale markings of the outer protractor chart 17. With this arrangement, the error of "parallax" is eliminated from the most useful portion of the lens and, many find such an arrangement less confusing to use in laying out the desired prescriptive characteristics of the lens.

It is to be understood, however, that the markings are of the same size and dimensional characteristics as the markings of the upper chart 17 and must be properly aligned therewith in a direction perpendicular to the plane of the chart 17 as set forth above in the preferred construction.

In forming the charts 17, 18, and 36 as disclosed herein, and in order to insure their being of identical shape and size as to related configurations a photographic negative either in plate or in film form may be used. A master chart having the desired configurations thereon is produced and two separate photographs are taken at the same settings. This latter method is employed if the plates are to be of negative form. If desired, it is possible to produce a negative plate and then produce two positives from the same negative thereby showing equal dimension.

In using the protractor, care is taken, as illustrated in Fig. 5, that the similar lines of the spaced charts 17 and 18 are positioned in superimposed relation with each other prior to placing the markings on the lens.

The said markings may be placed on the lens by suitable quick drying inks or other suitable means commonly used in the art.

By aligning the similar configurations of the spaced charts 17 and 18 which are in alignment with each other in a direction perpendicular to the planes of the said chart, the observer is assured that he is looking through the lens or blank in said perpendicular direction and thereby all error due to "parallax" is eliminated.

From the foregoing description, it will be seen that simple, efficient, and economical means have been provided for accomplishing all of the objects and advantages of the invention.

Having described my invention, I claim:

1. A device of the character described comprising a casing having a window opening therein, a laminated structure supported in said window comprising three superimposed plate-like members of transparent material and a pair of protractor chart members each sandwiched between the respective adjacent plate-like members and in laminated relation therewith, said protractor chart members being provided with scale lines of equal dimension and being in aligned relation with each other in a direction substantially perpendicular to the plane thereof, a source of illumination internally of the casing for rendering said chart members visible, the inner transparent plate member located between said chart members and said source of illumination having a light diffusing surface thereon.

2. A device of the character described comprising a casing having a window opening therein, a laminated structure supported in said window comprising three superimposed plate-like members of transparent material and a pair of protractor chart members each sandwiched between the respective adjacent plate-like members and in laminated relation therewith, said protractor chart members being provided with scale lines of equal dimension and being in aligned relation with each other in a direction substantially perpendicular to the plane thereof, a source of illumination internally of the casing for rendering said chart members visible, and means for causing the light therefrom to be reflected prior to its passing through said laminated structure, the inner transparent plate member located between said chart members and said source of reflected illumination having a light diffusing surface thereon.

3. A device of the character described comprising a casing having a window opening therein, a laminated structure supported in said window comprising three transparent plate members having a pair of chart members sandwiched therebetween, one of said transparent plate members lying between said chart members to hold them in spaced relation with each other, and said transparent plate members and chart members being adhesively joined in intimate bonded relation with each other, said chart members being provided with scale lines of equal dimension and being in aligned relation with each other in a direction substantially perpendicular to the plane thereof, and a source of illumination internally of the casing for rendering said chart members visible, the inner transparent plate member intermediate said chart members and said source of illumination having a light diffusing surface thereon.

4. A device of the character described comprising a casing having a window opening therein, a laminated structure supported in said window comprising a plurality of transparent plates and a pair of chart-like members each sandwiched between the respective adjacent transparent layers and in laminated relation therewith, one of said chart-like members having a full protractor chart thereon and the other only a central protractor chart portion simulating the central chart portion of the first protractor member and having a relatively clear area surrounding said central chart portion, said central chart portion of the first protractor member and said central chart portion being in aligned relation with each other in a direction substantially perpendicular to the planes of said protractor charts, a source of illumination internally of the casing for rendering said chart members visible, the inner transparent plate member located between said chart members and said source of illumination having a light diffusing surface thereon.

5. A device of the character described comprising a casing having a window opening therein, a laminated structure supported in said window comprising a plurality of transparent plates having a pair of protractor chart members sandwiched therebetween, one of said transparent plates lying between said protractor chart members to hold them in spaced relation with each other, said protractor chart members embodying relatively opaque and transparent portions in aligned relation with each other in a direction substantially perpendicular to the plane thereof and a source of illumination internally of the casing for rendering said chart members visible, the inner transparent plate member located between said chart members and said source of illumination having a light diffusing surface thereon.

JAMES A. STEWART.